(12) United States Patent
Norskog

(10) Patent No.: US 6,585,158 B2
(45) Date of Patent: Jul. 1, 2003

(54) COMBINED POINTING DEVICE AND BAR CODE SCANNER

(75) Inventor: Allen C. Norskog, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 240 days.

(21) Appl. No.: 09/726,755

(22) Filed: Nov. 30, 2000

(65) Prior Publication Data

US 2002/0063158 A1 May 30, 2002

(51) Int. Cl.⁷ .................................................. G06K 7/00
(52) U.S. Cl. ................... 235/462.13; 235/375; 235/454; 235/462.45; 235/442.1
(58) Field of Search ...................... 235/462.13, 472.01, 235/472.02, 472.03, 454, 462.16, 375

(56) References Cited

U.S. PATENT DOCUMENTS

| | | | |
|---|---|---|---|
| 4,794,384 A | * 12/1988 | Jackson | 345/157 |
| 5,068,520 A | * 11/1991 | Sato | 235/462.27 |
| 5,274,610 A | * 12/1993 | Tonomura et al. | 368/10 |
| 5,355,146 A | * 10/1994 | Chiu et al. | 345/156 |
| 5,448,050 A | * 9/1995 | Kostizak | 235/440 |
| 5,633,489 A | * 5/1997 | Dvorkis et al. | 235/462.43 |
| 5,804,803 A | * 9/1998 | Cragun et al. | 235/375 |
| 5,909,209 A | * 6/1999 | Dickinson | 345/163 |
| 5,994,710 A | 11/1999 | Knee et al. | 250/557 |
| 6,036,094 A | * 3/2000 | Goldman et al. | 235/462.45 |
| 6,119,944 A | * 9/2000 | Mulla et al. | 235/462.43 |
| 6,392,632 B1 | * 5/2002 | Lee | 345/156 |

FOREIGN PATENT DOCUMENTS

JP 04120616 * 4/1992 .......... G06F/3/033

* cited by examiner

Primary Examiner—Michael G. Lee
Assistant Examiner—Seung H Lee

(57) ABSTRACT

A computer mouse uses an optical sensor to detect movement and thereby generate signals to control movement of an on-screen icon. The optical mouse also includes circuitry or a processor to detect bar codes and demodulate data encoded therein.

17 Claims, 2 Drawing Sheets

BASIC BAR CODE
DETECTOR CIRCUIT

ENHANCED CIRCUIT
FOR BAR CODE DETECTION

COMBINED POINTING DEVICE AND BAR CODE SCANNER

BACKGROUND OF THE INVENTION

This invention relates to the well-known computer control device that is commonly referred to, and known as a mouse.

Those familiar with personal computers know that a "mouse" is actually a computer input device that is used for a variety of tasks. Among other things, a mouse provides a pointing device metaphor that is used to identify (and initiate) executable programs, locate or place an insertion point icon in a document, discard files by "dragging and dropping" a file icon into a metaphorical trash can. A mouse can also be used to control the scrolling action of a screen and the images displayed thereon by software executing on a computer's processor. A mouse can also be used to select files to open or close; delete or retrieve files as well as shut down the computer to which it is coupled. A mouse and the on-screen icon it uses, is sometimes referred to as a pointing device in that it's on-screen icon is usually used to identify (or point to) one or more icons representing file or program metaphors (icons).

A computer mouse on-screen icon moves about the screen in response to the physical movement of the mouse across a surface, such as a table or desk. In other words, if a computer mouse is moved left, computer software causes its on-screen icon to also move left, generally in an amount directly related to the distance that the mouse moved across the surface. Moving a mouse right across a surface usually causes the onscreen mouse icon to also move right.

On-screen mouse icon movement is typically achieved by way of electrical signals that are output from a mouse device in response to its actual physical movement. Signals from the mouse can be made to change in response to physical movement by using either a track ball mechanism that rotates small potentiometers or using more sophisticated optical position sensors that can "see" movement of a surface with respect to the mouse.

An optical mouse is known art and is disclosed in at least U.S. Pat. No. 5,994,710 for a "Scanning Mouse for a Computer System," which is incorporated herein by reference. In particular, however, the teachings of U.S. Pat. No. 5,994,710 that relate to optically sensing (detecting) movement of the mouse and the optical scanning of images thereon is incorporated herein by reference. An optical mouse which detects movement over a surface and which is also capable of reading optically encoded information would be an improvement over the prior art. A mouse having an optical scanning and bar code reading capability might prove to be valuable in the Internet age.

SUMMARY OF THE INVENTION

There is provided an optical mouse (for use as a pointing device with a computer) that is combined with a bar code scanner. One or more optical image sensors in combination with electronic circuitry, detects physical movement of the mouse and also detects the lines and spaces that comprise a bar code.

DETAILED DESCRIPTION OF THE PREFERRED EMBODIMENT

U.S. Pat. No. 5,994,710 to Knee et al, for a "Scanning Mouse for a Computer System" (the '710 patent) discloses a combination optical mouse and optical scanner. A charge coupled device (CCD) or contact image sensor (CIS) is used to sense movement of the mouse over a surface as well as "read" (scan) images into a digital representation of them. Images on a surface are scanned by a linear CIS mounted within a mouse and read into a computer a line at a time (the scanned line "width" corresponding to the length of the CIS) such that by repetitively sweeping the CIS over an image, successive passes of the mouse/scanner enables an entire image to eventually be scanned into the computer. The teachings of the '710 patent are incorporated herein by reference, particularly the teachings with respect to optically detecting movement and scanning images and as enabled by the apparatus depicted in FIG. 3 (of the '710 patent) thereof.

Figure 1:
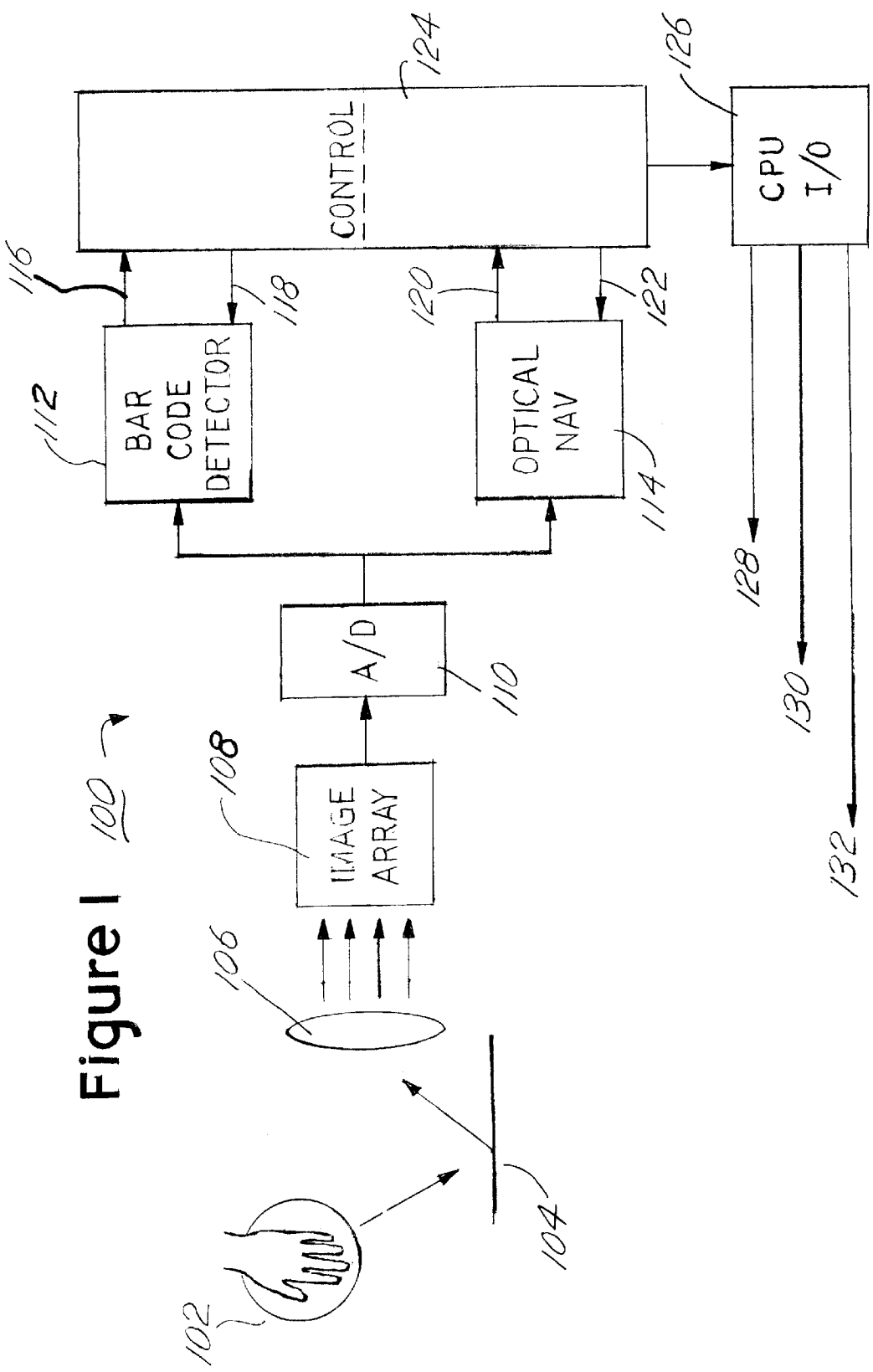
FIG. 1 is a simplified block diagram of a combination optical mouse and bar code scanner.

FIG. 1 of the instant application shows a simplified block diagram of the functional elements of an example of a combined optical mouse and bar code scanner 100. Like the '710 patent, a light source 102, provides a source of light that illuminates images (not shown) on a surface 104 over which the mouse is moved. Light waves from the light source 102 are reflected from the surface 104 and focused by a lens 106 onto an analog image detector array 108.

The image array 108 produces an analog output voltage that is representative of the reflected and focused image. An analog-to-digital converter (A/D) 110 produces digital scan data that is representative of an image that was scanned.

Digital output from the A/D 110 is routed to an optical navigation circuit 114, which detects physical movement of the mouse over a surface. Digital output from the A/D 110 is also routed to a bar code line and space detector 112 (hereafter "bar code detector").

Figure 2:
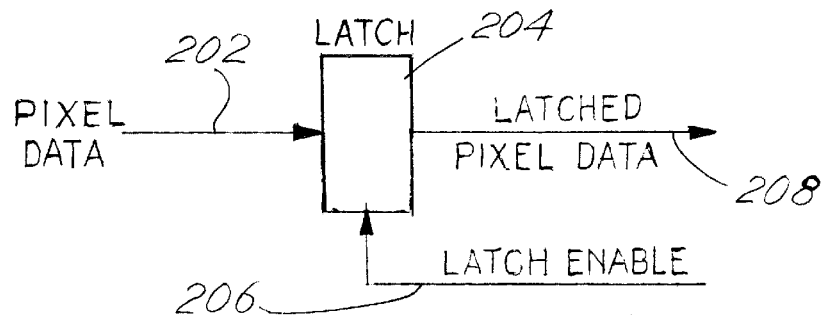
FIG. 2 depicts a simplified representation of a bar code detector circuit.

A simplified example of a bar code detector circuit 200 is shown in FIG. 2. Row-by-row and column-by-column pixel data 202 from the A/D converter 110 (or other source of pixel data) is latched in a data latch 204. A latch enable signal 206 can be used to clock data into the latch 204 by the controller 124 so that a data value 208 can be read at some later time for subsequent processing.

In one embodiment, the controller 124 can latch all of the pixels from the image array 108 (after being digitized) and write both the pixel data and the pixel data row and column address information into an array such that the value of each pixel can be recovered by the stored row and column address of each pixel. As a new image is acquired by the image array 108 (as the mouse is moved across a surface) a new value for each pixel, at each address can also be stored. By comparing successive values for one or more pixels, the presence or absence of a bar code line can be determined.

In an alternate embodiment, one pixel (or a subset or a closely spaced cluster of all pixels) can read from the image array 108 for analysis to determine if the mouse is over (and therefore scanning) a bar code. As that particular pixel data (or the pixels of the chosen subset or cluster are read) is read, it can be latched in the data latch 204. As successive data values for that one pixel (or for successive values for the pixels of the chosen subset) are read, they can be tested (for values representing dark and light area) to determine if they represent the presence or absence of a bar code line. In yet another embodiment, pixel data values might be averaged over time or distance (movement of the mouse) in the process of deciding if a bar code line or space is being detected. Averaging or using clusters of pixels can effectively degrade the detected contrast between light and dark image regions. Whether to use or calculate pixel data averages or to use clusters of pixels is a design choice as well as is methodology employed in the calculations thereof. Optimum values and methods will be subject to some experimentation.

By using a data latch 204 and reading data from it into memory, image data processing, which might be done by the computer to which the mouse is coupled or the controller 124 within the mouse, can be deferred. For purposes of claim construction, pixel data processing that is done by either a computer (to which the mouse is coupled) or the controller 124, is considered to be equivalent.

Figure 3:
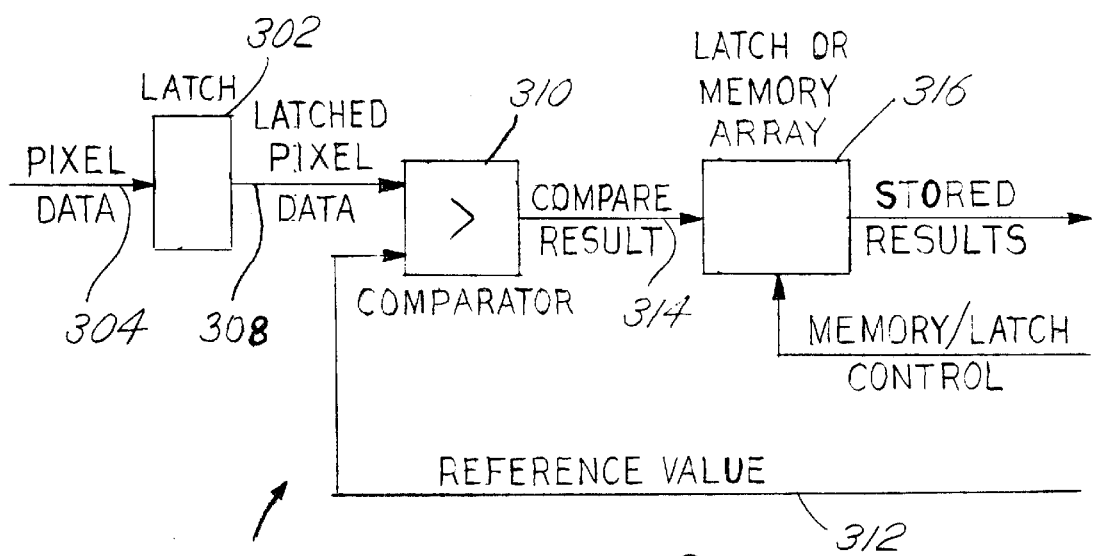
FIG. 3 shows another simplified representation of a bar code detector circuit.

FIG. 3 shows another simplified embodiment of a bar code detector circuit 300 for use in a combination optical mouse and bar code scanner. Like the embodiment shown in FIG. 2, pixel data values 308 stored in a data latch 302 (latch enable omitted for clarity) that are obtained 304 from the image sensor 108 are compared in a comparator 310 to determine if the latched pixel data value represents a bar code line or space. The reference values 312 against which latched pixel data is compared can be empirically determined such that if the latched pixel data is greater or less than the comparison values a determination can be made with reasonable certainty that the image array of the mouse is likely acquiring the image of a bar code line or space. Reference pixel data values can be dynamically determined to compensate for, among other things, light source 102 intensity variations, ambient light conditions, lens 106 cleanliness or clarity and scanned surface/scanned image conditions.

The comparison results 314 can be stored in a data latch or even a memory array 316 under the control of the controller 124 or even a PC to which the mouse is connected. In such an embodiment, the data stored in the latch/array 316 can represent a number of pixel data values that were greater than, less than or equal to a reference value, enhancing the calculated determination of whether the scanned image was a bar code line or space.

Regardless of how the determination of a bar code line or space is made, the width of both the lines and spaces must also be determined. Any of the foregoing embodiments can be used to determine bar code line and space width, in part, by correlating the acquired data values with the detected movement (and velocity) of the mouse.

As shown in FIGS. 1, 2 and 3, pixel data processing can be performed within the controller 124 within the mouse. Such processing can include the determination of a bar code line or space, as well as width, but can also include the demodulation of encoded bar code data. In other words, data that is encoded into the bar code lines and spaces can be extracted within the controller 124. In an alternate embodiment, raw data (simply the line and space data) can be sent to the personal computer to which the mouse is attached. Such an embodiment will require that more data be passed up to the PC for processing. The relative limited processing power of most microcontrollers that are presently available however, as compared to the processing power of most personal computer CPUs might yield an overall speed improvement even if large amounts of pixel data must be sent up to the PC CPU for processing instead of within the mouse.

Those skilled in the art will recognize that at least some of the functionality provided by a hardware embodiment, such as those shown in FIGS. 2 and 3, can almost always be accomplished in software. By appropriately programming an appropriately capable microprocessor, microcontroller or combinations thereof, pixel data from the image array 108 (or from the A/D converter 110) can be latched, compared and processed to detect a bar code line or space as well as the relative widths thereof. In at least one embodiment, pixel data processing is performed within the controller 124, assisted by the various hardware components set forth above. With reference to FIG. 1, controller 124 sends control signals 118, 122 to the bar code detector 112 and optical navigation detector 114 respectively and also receives data 116, 120 (respectively) there from. Data 120 read from the navigation detector 114 under the control signals 122 to the navigation detector 114 are used to sense movement. Whenever data from the navigation detector 114 indicates movement, control signals 118 to the bar code detector 112 can be used to read whether a line or space was read by the data 116 returned from the bar code detector 112.

The controller 124, which might include a microcontroller or other processor, (which preferably also includes the functionality of the bar code detector 112) formats the detected bar code data (encoded into the bar code symbol) and writes the data to an interface 126 for a computer. Three output lines 128, 130 and 132, corresponding to mouse button input/output signals 128, light source (102) control line 130 and demodulated data output 132, either carry data from the combination mouse/bar code scanner back to a computer for subsequent processing, or carry data from the computer to the combination mouse/bar code scanner.

In embodiments that include bar code demodulation capability, the demodulated data output 132 preferably carries demodulated data or information that was recovered from a scanned bar code. In embodiments that only read or detect a bar code line and space, the demodulated data output 132 might carry only the line and space information to the PC for subsequent processing and information recovery.

In the preferred embodiment, the light source control line 102 is used to alter the brightness of the light source. In at least one embodiment, the light source is turned off when the mouse hasn't seen motion for a while thereby saving power and lengthening the lifetime of the light source. However, if the light source is turned off, the mouse can't detect motion so the mouse is occasionally "awakened" by turning the light back on long enough to take another picture. If the new image looks like the previous one, the mouse returns to "sleep" for a while with the light off. If on awakening the new image is different, the light will be kept on as the mouse responds to movement. In addition to turning the light on or off, the light source signal line 102 can also control the intensity of the light source. If the mouse were on bright white paper, the light intensity can be reduced as compared to the intensity it might be set at if it's used on paper that is less reflective.

In the preferred embodiment, the combination optical mouse and bar code scanner is employed to "read" Internet web address data that is encoded into bar codes printed onto various media. In such an embodiment, the combination optical mouse and bar code scanner is used to "read" the universal resource locator (URL) of a web site directly into a computer and an Internet browser. By way of example, an advertisement printed in a newspaper or magazine might include a bar code or other graphical symbol, the characteristics of which represent certain data. By reading the bar code or graphical symbol, encoded data can be immediately transferred into a user's computer. If the encoded data is a web site address, an advertiser in a newspaper or magazine can quickly route prospective customers (or other individuals) to a particular web site. Alternate (and equivalent) embodiments would be used to read UPC bar codes or other as-yet determined bar codes used to track inventory, track documents marked with bar codes and so forth.

The inclusion of additional functionality of an optical bar code reader into an optical mouse can enhance the value of such an optical mouse pointing device by enabling the optical mouse/bar code scanner to provide a convenient mechanism to read encoded data directly into a computer. An Internet web site address can be quickly and reliably entered into a web browser. Inventory marked with bar codes can be scanned using the same apparatus used to control a PC. Other items marked or identified by bar codes can also be tracked by the PC using an optical mouse.

What is claimed is:

1. A combination pointing device and bar code reader comprised of:

an optical image sensor, which produces electrical output signals representative of images detected on a media surface;

a movement sensor circuit, said movement sensor coupled to, and receiving signals from said optical image sensor;

a bar code pattern detector coupled to and receiving signals from said optical image sensor;

at least one data output port from which output signals are sent to a computer to which said pointing device is coupled;

whereby data encoded in a bar code is recovered by detecting bar code lines and determining the relative velocity of the pointing device moving across said bar code lines.

2. The combination pointing device and bar code reader of claim 1 further including an analog to digital converter, an analog input of which is operatively coupled to said optical image sensor, the output of which is operatively coupled to said bar code pattern detector.

3. The combination pointing device of claim 1 wherein said bar code pattern detector is comprised of a data latch coupled to said optical image sensor.

4. The combination pointing device of claim 1 wherein said bar code pattern detector is comprised of a data comparator coupled to said optical image sensor.

5. The combination pointing device of claim 1 wherein said bar code pattern detector is comprised of a processor coupled to said optical image sensor.

6. The combination pointing device and bar code reader of claim 1 further comprised of a controller, said controller operatively coupled to and receiving data from at least one of said movement sensor and said bar code pattern detector, said controller having an output from which bar code data is output to a computer to which said combination pointing device and bar code reader is coupled.

7. The combination pointing device and bar code reader of claim 1 wherein said movement sensor is comprised of a circuit receiving picture element (pixel) data obtained from signals from said optical image sensor and detecting the movement of said pointing device from said pixel data.

8. The combination pointing device and bar code reader of claim 1 wherein said bar code pattern detector is comprised of a circuit receiving picture element (pixel) data obtained from signals from said optical image sensor and detecting the presence and absence of substantially opaque lines on said media surface.

9. A combination pointing device and bar code reader comprised of:

an optical image sensor means for producing electrical output signals representative of images detected on a media surface;

a means for detecting movement of said pointing device relative to said media surface is determined, said means for detecting movement being coupled to and receiving signals from said optical image sensor;

a means for detecting lines comprising a bar code pattern, said means for detecting lines being coupled to and receiving signals from said optical image sensor;

whereby data encoded in a bar code is recovered by detecting bar code lines and determining the relative velocity of the pointing device moving across said bar code lines.

10. A method of recovering data embedded into images on the surface of a media comprised of:

optically scanning the surface of said media using an image detector embedded in a computer pointing device to detect images on said media;

detecting movement and determining the relative velocity of said computer pointing device from images detected by the image detector on said media;

determining at least one of: the number, spacing and width of symbols in images detected by the image detector on said media, which comprise a bar code;

recovering from said symbols, at least a first data that is encoded as part of said symbols on said media.

11. The method of claim 10 wherein said step of determining at least one of: the number, spacing and width of symbols on said media includes the step of:

obtaining data representing at least one picture element from the image detector;

comparing the data representing at least one picture element to a reference value;

determining if the data representing at least one picture element is either a line or a space of a bar code symbol.

12. The method of claim 11 further including the step of averaging data representing at least one picture element from the image detector over at least one of: time and distance.

13. The method of claim 11 further including the step of using at least one of the movement and relative velocity of said computer pointing device to decode information in said bar code.

14. The method of claim 11 further including the step of receiving at a computer to which said computer pointing device is coupled, signals representing information encoded into said symbols on said media, which comprise a bar code.

15. The method of claim 11 further including the step of accessing a computer resource identified by information encoded into said symbols on said media, which comprise a bar code.

16. The method of claim 15 wherein said computer resource is an Internet web site.

17. The method of claim 11 wherein information encoded into said symbols on said media is a UPC bar code symbol.

* * * * *